Dec. 19, 1961 R. F. J. FILIPOWSKY 3,014,181

GENERATOR OF PULSES WITH SEQUENTIALLY INCREASING SPACING

Filed Jan. 25, 1960 2 Sheets-Sheet 1

WITNESSES

John E. Healy, Jr.

James F. Young

INVENTOR

Richard F. J. Filipowsky

BY D. W. Cleary

ATTORNEY

Dec. 19, 1961 R. F. J. FILIPOWSKY 3,014,181

GENERATOR OF PULSES WITH SEQUENTIALLY INCREASING SPACING

Filed Jan. 25, 1960 2 Sheets-Sheet 2

United States Patent Office 3,014,181
Patented Dec. 19, 1961

3,014,181

GENERATOR OF PULSES WITH SEQUENTIALLY INCREASING SPACING

Richard F. J. Filipowsky, Santa Ana, Calif., assignor to Westinghouse Electric Corporation, East Pittsburgh, Pa., a corporation of Pennsylvania Filed Jan. 25, 1960, Ser. No. 4,389
7 Claims. (Cl. 328—55)

This invention relates to a pulse generator and more specifically to a generator for producing a plurality of pulses with variable time intervals therebetween for use in computers, communications systems, counting circuits, etc.

An object of this invention is to provide a generator which produces a plurality of pulses which are accurately spaced a given or predetermined distance apart.

Another object of the invention is the provision of a generator for producing pulses, the spacing between which varies arithmetically in time sequence.

Still another object of the invention is to provide a pulse generator which will accurately produce pulses that are spaced in time by intervals which vary arithmetically in a predetermined sequence without producing any accumulative error between spacings.

A further object of the invention is the provision of a pulse generator for producing pulses, the spacing between pulses being sequentially increased arithmetically and including provisions for varying the arithmetical increase of spacing between the pulses.

The above-mentioned and other features and objects of this invention will become more apparent by reference to the following description taken in conjunction with the accompanying drawings, in which.

Figure 3:
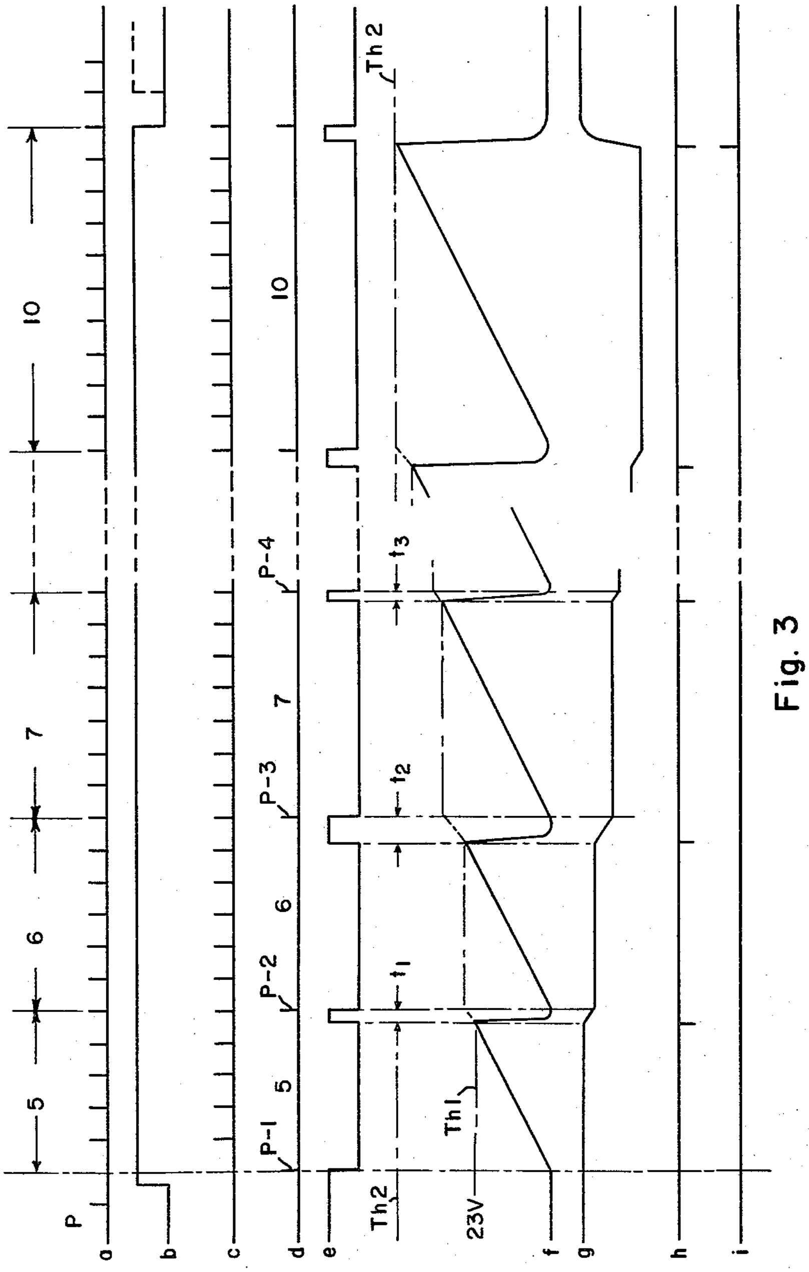
FIG. 3 illustrates waveforms useful in explaining the invention.

In the drawing the connections between stages have noted thereon letters which correspond to the particular waveform illustrated in FIG. 3. More specifically, the lead identified as "*a*" in FIG. 1 has the waveforms appearing thereon as illustrated in curve *a* of FIG. 3. Likewise, the lead adjacent "*b*" has a waveform during the operation of the device illustrated in curve *b* of FIG. 3, etc.

Figure 1:
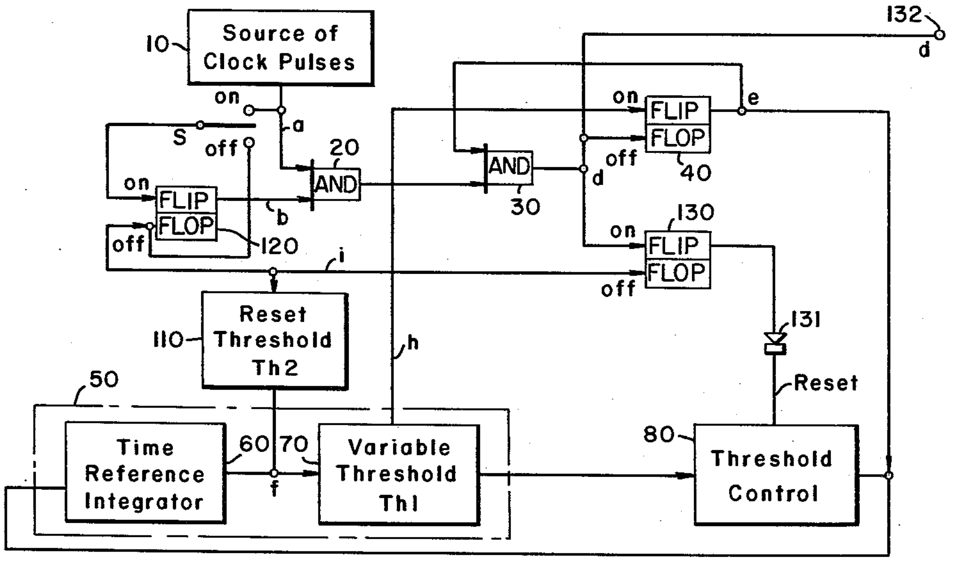
FIG. 1 is a schematic diagram in block form of an embodiment of the invention.
Figure 2:
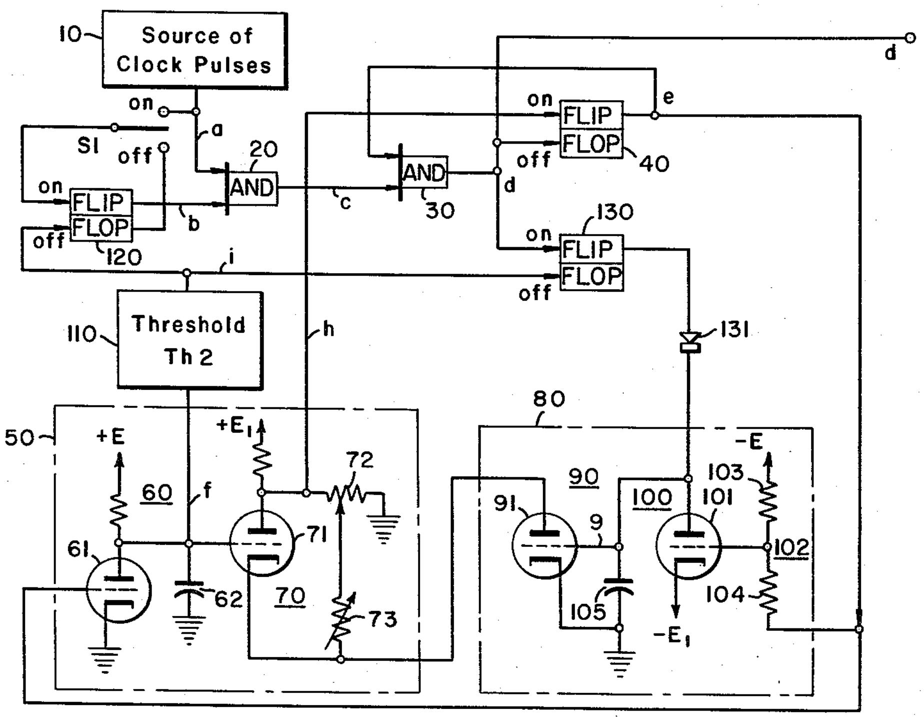
FIG. 2 is a schematic diagram partially in block form of the embodiment shown in FIG. 1.

The pulse generator shown in FIG. 1 and FIG. 2 will produce output pulses with the time spacing therebetween forming an arithmetic sequence such as 5 milliseconds, 6 milliseconds, 7 milliseconds, etc. It will be understood after the explanation of the generator that this spacing could be altered to be incrementally increasing by 2 milliseconds so that the spacing between the pulses is 5 milliseconds, 7 milliseconds, 9 milliseconds, etc. However, for purposes of explanation and clarity the operation of the device and the construction thereof will be described so that the incrementally increasing spacing between the pulses is as shown in curve *b* of FIG. 3, that is, 5 ms., 6 ms., 7 ms., etc. It will be understood that various values can be employed in spacing the pulses without departing from the spirit and scope of he invention. The spacing illustrated in FIG. 3 being merely for purposes of illustration.

The embodiment illustrated in FIG. 1 will produce output pulses at the output terminals 132 with incrementally increasing spacing between the pulses such as shown in curve *d* of FIG. 3. The embodiment of the invention in FIG. 1 includes a source of clock pulses 10. This source of clock pulses 10 will produce a constant and highly accurate train of uniformly spaced pulses having a relatively small equal spacing therebetween as illustrated by curve *a* in FIG. 3. As shown in curve *a*, the spacing between the clock pulses from the source of clock pulses 10 is 1 millisecond. Such a source of clock pulses having relatively short time intervals therebetween are well known in the art and highly stable.

When its is desired to start the generator, the switch S is turned to the "on" position, and an initial clock pulse P will be fed from clock 10 to a bistable flip-flop 120 to produce an output rectangular waveform from the flip-flop 120 similar to that shown in curve *b* of FIG. 3. The rectangular waveform is applied to a normally non-conducting and gate 20 so as to render the gate 20 conductive during the period which the flip-flop 120 is in the "on" condition. Rendering the gate 20 conductive allows the next clock pulse P–1 to pass through the gate 20 and be applied to an and gate 30, as shown in curve *c* of FIG. 3.

The first or initial pulse P–1 of the train of clock pulses will pass through the gate 30 and be applied to a bistable flip-flop 40, the output of which is shown in curve *e*. The flip-flop 40 is turned off by the initial pulse of the train of pulses, and will immediately close the gate 30 rendering it non-conductive and preventing the passage of the second pulse of the train of pulses through the and gate 30. Additionally, when the flip-flop 40 is turned off by the initial clock pulse, it will actuate a time delay 50 which after a predetermined time interval will provide an output pulse that will reset the flip-flop 40 to the "on" position, so as to render the gate 30 again conductive and pass another clock pulse through the gate 30 which will then start the cycle described above.

The time delay 50 and a threshold control 80 will operate so that the third pulse passed by the gate 30, will be spaced a time length from the second pulse passed by the gate 30, a time length which is a predetermined time length greater than the time length between the first and second clock pulses passed by the gate 30. More specifically as shown in FIG. 3, the spacing between the first and second time pulse is illustrated as 5 ms., whereas the spacing between the second and third clock pulse passed by gate 30 is 6 ms.

The time delay 50 comprises a time reference integrator 60 which receives, and is actuated by, the output of the flip-flop 40 when it is turned off by a clock pulse. The time reference integrator output is illustrated in curve *f* of FIG. 3. The output of the time reference integrator 60, as shown in curve *f*, is a linear increasing output signal that is applied to a variable threshold 70. This variable threshold 70 has a threshold illustrated as $Th1$ in curve *f* of FIG. 3 and will produce an output pulse or signal when the threshold present in the variable threshold is exceeded by the time reference integrator 60. When the threshold $Th1$ is exceeded by the integrator 60 an output signal from the variable threshold 70 will be applied back to the flip-flop 40 so as to turn the flip-flop 40 on to thereby reset the time reference integrator 60 to zero and also render the gate 30 conductive. The gate 30 will then be rendered conductive as illustrated in curve *e* of FIG. 3 for a time period $t1$ so as to pass a second pulse P–2 through the gate 30. As explained above, when the second pulse P–2 passes through the gate 30, the flip-flop 40 is turned off and renders the gate 30 again non-conductive so as to form a time period $t1$ during which the gate 30 is rendered conductive and the flip-flop 40 turned on.

As can be seen from curves *e* and *f* of FIG. 3, the time reference integrator 60 will be turned off during the periods which the gate 30 is conductive and the flip-flop 40 is turned on, that is time periods $t1$, $t2$ and $t3$, etc. When the gate 30 is rendered non-conductive by the flip-flop 40 being turned off, the integrator 60 will be turned on. During the time periods $t1$, $t2$ and $t3$, the output of flip-flop 40 will be applied to a threshold control 80. The details of this threshold control 80 will be described later and are illustrated in FIG. 2. The threshold control 80 operates to increase the time delay of the time delay 50 by varying the threshold of the variable threshold 70 in accordance with and as a function of the time duration of the time periods, $t1$, $t2$ and $t3$, which are applied to the threshold 80.

Due to the output of the flip-flop 40 being applied to the threshold control 80, the increase of the threshold 70 will be such that it will take the integrator 60 about 1 ms. more in time before it exceeds the threshold T*h*1 on next cycle. It will be understood that the increment of 1 ms. is being employed merely for the purposes of explanation. As can be seen in curve *e* of FIG. 3, however, the time periods $t1$, $t2$ and $t3$ may not be equal in time duration due to error in the output of the threshold 70 which turns flip-flop 40 on. Hence, if the output of the threshold 70 produces an output pulse a substantial time before third pulse P–3 is passed through gate 30, the period during which the flip-flop 40 is turned on, $t2$ will be substantially greater than the previous period $t1$. Hence, when the output of the flip-flop 40 is applied to the threshold control 80 for the time period $t2$, it will effect an increase of threshold of the variable threshold 70 such that it will take the integrator 60 more than 1 ms. more in time to exceed the threshold of threshold 70 on the next cycle. If the time period during which the output of the flip-flop 40 is applied to the threshold control 80 is relatively small, the increase effected by the threshold control 80 will be substantially less than 1 ms. in rise time for the integrator 60 to exceed threshold T*h*1, as shown in curves *e* and *f* of FIG. 3.

Thus, the increase of rise time or the increase of the time delay of the time delay means 50 will be dependent upon or a function of the time during which the gate 30 and the flip-flop 40 are turned on. For this reason it will be understood that the gate 30 will be turned on during the preselected time during which a preselected pulse will pass through the gate 30 and any error of the gate 30 opening too soon will not be accumulative, and it will not result in an error in later spacing of the pulses. The output of the integrator 60 is also fed to a reset threshold T*h*2 illustrated by numeral 110 in curve *f* of FIG. 3. When the integrator 60 reaches an output equal to the threshold T*h*2, there will be an output pulse from the threshold 110 as illustrated in curve *i* of FIG. 3. This output pulse will be passed to the flip-flop 120 to turn off flip-flop 120 and thereby close gate 30 preventing flip-flop 40 from applying any more energy to control 80. Further, the output pulse from threshold 110, as shown in curve *i* of FIG. 3, will switch off flip-flop 130 which will reset the threshold control 80 and the threshold 70 through a diode 131.

When it is desired to again turn the generator on, the switch S will be placed in the "on" position so as to effect conduction of gate 20 and thereby pass an initial pulse through gate 30 to then again start the cycle.

FIG. 2 is a schematic diagram in partial block form with the time delay means 50 and the threshold control 80 shown in detail. As shown in FIG. 1 and FIG. 2, the time delay means 50 includes a time reference integrator 60 which produces a linear increasing output signal, shown in curve *f* of FIG. 3, which is applied to a variable threshold 70. As shown in FIG. 2, the time reference integrator 60 includes a triode 61 with the plate of the triode being connected to an integrating capacitor 62. The triode 61 is rendered conductive by the flip-flop being turned on, and when the flip-flop 40 is turned off, the tube 61 will be rendered non-conductive so as to effect an increased voltage on the plate of the triode 61 which was substantially at ground potential when the tube 61 was conducting. When the triode 61 is rendered non-conductive, the charging capacitor 62 will build up a potential in a fashion shown in curve

*f* of FIG. 3. The potential as illustrated in curve *f* of FIG. 3 will be linearly increasing and will be applied to the variable threshold 70.

As shown in FIG. 2, the variable threshold 70 comprises a normally non-conducting triode 71. The signal grid of the triode 71 receives the output from the integrator 60. When the potential on the grid of the triode 71 is raised sufficiently by the output of the integrator 60 (the charge on 62), the threshold established by the threshold 70 will be exceeded, and the triode 71 will then be rendered conductive so as to apply a pulse back to the flip-flop 40 on lead *h* and thereby turn off the flip-flop. When the flip-flop 40 is turned off by the triode 71 being rendered conductive, the integrator 60 will be reset by the triode 61 being rendered again conductive to thereby discharge the charging capacitor 62 and reset the integrator to zero, since the plate of the triode 61 will be at approximately ground potential when the triode 61 is conducting.

The threshold level of the threshold 70, and more specifically the point at which the triode 71 is rendered conductive by the output from the integrator 60, is determined and increased by the threshold control 80 shown in dotted lines in FIG. 2. More generally, the time delay of the time delay means 50 is varied and incrementally increased by control 80 after each pulse that is passed by the gate 30. The threshold control 80 comprises generally a threshold reference stage 90 and a reference control stage 100. The threshold reference stage 90 comprises a triode 91 whose anode is connected to the cathode of the triode 71. The cathode of the triode 91 is connected to ground. The reference control stage 100 includes a triode 101 whose anode is connected to the grid of the triode 91 with a charging capacitor or storage means 105 connected between the grid and the cathode of the triode 91. A voltage divider 102 comprising resistors 103 and 104 have a common connection which is connected to the grid of the triode 101. The other end of the resistor 104 is, in turn, connected to the grid or the grid of the triode 61 and the output of flip-flop 40. The other end of the resistor 103 is connected to the negative side of the voltage source —E and the cathode of the triode 101 is connected to another voltage source —E1 which is substantially less than the voltage source —E. The voltage divider 102 renders the triode 101 normally non-conductive. However, when the flip-flop 40 is turned on during the operation of the device, the triode 101 will be rendered conductive during the time period $t1$, $t2$ and $t3$ illustrated in curve *e* of FIG. 3. During these periods $t1$, $t2$ and $t3$, the storage means (capacitor 105) will be incrementally driven more negative as shown in curve *g* of FIG. 3, thereby raising the potential on the cathode of the triode 71 so as to raise the potential necessary on the grid of the triode 71 to enable conductor of the triode 71.

When the flip-flop 130 is turned on by the first pulse which passes through gate 30, it will apply a negative potential to one side of the diode 131 to enable charging of capacitor 105 by stage 100. When the flip-flop 130 is turned off, it will apply a zero potential to the same side of the diode 131 to discharge capacitor 105. The examples of voltages in this operation are when the flip-flop 130 is turned on it will apply a potential of —50 volts to the diode 131 so that T*h*2 can be about 45 volts. The cathode of the triode 101 is connected to a —200 volt potential. The upper side of resistor 103 is connected to a —500 volt and the grid of the triode 101 varies between —200 volts to render triode 101 conductive and —250 volts to render triode 101 non-conductive when the flip-flop 40 is in the "on" or "off" position, respectively. When, of course, the flip-flop 40 is on, the grid of the triode 101 will be raised to —200 volts to render the triode 101 conductive. When the flip-flop 130 is turned off, the capacitor 105 will be discharged and reset to zero. This is accomplished by threshold 110 having a threshold of $Th2$ as illustrated in curve $f$ of FIG. 3. The threshold 110 is connected to the grid of triode 71 so that when the grid of triode 71 exceeds a predetermined level $Th2$ the threshold 110 will produce an output pulse which will turn off both the flip-flops 130 and 120 to thereby discharge capacitor 105 and close and gate 20. When capacitor 105 is discharged, threshold $Th1$ will be lowered to its initial threshold so as to produce an output pulse on the anode of triode 71. This output pulse will turn on flip-flop 40 and open and gate 30. The circuit will then be conditioned to commence generation of a new series of pulses.

The new series of pulses may then be started either manually or by switching the switch S1 on flip-flop 120 to the "on" position or by automatically sending any trigger pulse to the on terminal of flip-flop 120. The generator can be turned off by turning the flip-flop to the "off" position, thereby closing gate 20. The potentiometer 72 is connected between the anode of triode 71 and ground. The variable contact of the potentiometer 72 is connected to the cathode of the triode 71 through a variable resistor 73. Hence, the absolute minimum interval with which the series of pulses will start can be adjusted by setting the potentiometer 72. In the example illustrated, the potentiometer 72 was set to such a potential that the first interval would be 5 ms. Making this potential larger will produce a longer first interval. The increment for which one interval is larger or increased over the previous one may be adjusted by the resistor 73 or by the size of the capacitor 105. If the capacitor 105 is smaller or if resistor 73 is made larger, then the increment will be made larger. By adjusting the resistor 72 or the capacitor 105, the increments of time increase can be made to be equal to 2, 3, 4, 5 or any larger number of milliseconds from pulse to pulse.

In summary, it is seen that when the device is turned on, the initial clock pulse P–1 will pass through and gate 30 to turn off flip-flop 40 and render the triode 61 nonconductive. Before the next succeeding pulse from the timer 10 passes through and gate 30, the gate 30 will be turned off by the flip-flop 40. With the flip-flop 40 being turned off, the integrator 60 is turned on so as to raise the potential on the grid of threshold triode 71. When the triode 71 is rendered conductive by the potential on capacitor 62, an output pulse illustrated in curve $h$ of FIG. 3 will be passed back to the flip-flop 40 to again turn the flip-flop 40 on and thereby open gate 30 for passage of a second pulse P–2. When the second clock pulse is passed, it will again turn flip-flop 40 off which will effect closing of gate 30 and also again start the integrator 60. During the time periods which the flip-flop 40 is turned on, the triode 101 will be rendered conductive to thereby drive storage capacitor means 105 more negative in proportion to the time during which the flip-flop 40 is turned on. As a result of this, the time delay of the time delay means 50 will be increased by raising the cathode potential of the triode 71 so that the time necessary to render the triode 71 conductive will be approximately 1 ms. longer than was necessary for the integrator 60 to render the triode 71 conductive after the occurrence of pulse P–1. After the third pulse has passed through the gate 30 the flip-flop 40 will again be turned off and the cycle will be repeated.

It is a special feature of the invention that all increments are controlled by the master timer and any small error in the circuits producing these time elements will not be carried on to the next time interval. Whenever the impulse emanating from the variable threshold 70 and illustrated in curve $h$ of FIG. 3 should appear too early, then the interval during which the flip-flop 40 is turned on ($t1$, $t2$ or $t3$) will be relatively long. This means third capacitor 105 will become more negative than if this interval had been small. By capacitor 105 being made more negative more than one increment produces a slightly higher potential on the type of triode 91 so that the next impulse from the variable threshold 70 will be delayed further and the next interval during which the flip-flop 40 is on will be substantially smaller. This is illustrated in curve $e$ of FIG. 3 by the showing of the time intervals $t2$ and $t3$. As shown in this figure the time period $t2$ is too wide and is compensated for so that the time period $t3$ becomes substantially smaller.

While I have described above the principles of my invention in connection with the specific apparatus, it is to be clearly understood that this description is made only by way of example and not as a limitation to the scope of my invention as set forth in the objects.

I claim as my invention:

1. A generator for producing a plurality of pulses comprising a source of clock pulses spaced apart by predetermined time periods, normally open gate means for selectively passing said pulses, means responsive to pulses passing through said gate means to close said gate means, time delay means responsive to a first clock pulse to render said gate means open after a predetermined timed interval for passing a second clock pulse through said gate means, and means responsive to said second clock pulse for varying the time delay of said time delay means.

2. A generator for producing a train of pulses comprising a source of clock pulses spaced by predetermined equal time intervals, normally open gate means for selectively passing said pulses, means responsive to pulses passing through said gate means to close said gate means, time delay means responsive to a first clock pulse to open said gate means during the time interval immediately preceding a second clock pulse to pass said second clock pulse through said gate means and means responsive to said second clock pulse to increase the time delay of said time delay means to provide a longer time spacing between said second clock pulse and a third clock pulse than between said first clock pulse and said second clock pulse.

3. A generator for producing a train of pulses comprising a source of clock pulses spaced apart by relatively short equal time intervals, gate means for selectively passing said pulses, means responsive to pulses passing through said gate means to close said gate means, time delay means responsive to a first clock pulse to open said gate means at a point in time during the time interval immediately preceding a second clock pulse to enable said second clock pulse to pass through said gate means and means responsive to said second clock pulse to increase the time delay of said time delay means as a function of the time length between said point in time and said second clock pulse.

4. A generator for producing a train of pulses comprising a source of clock pulses spaced apart by relatively short equal time intervals, gate means for passing selected pulses of said train of pulses, means responsive to said pulses passing through said gate means to close said gate means, time delay means responsive to a first clock pulse to open said gate means at a point in time during the time interval immediately preceding a second clock pulse to enable said second clock pulse to pass through said gate means, said time delay means comprising integrator means for producing a time increasing output signal in response to a clock pulse in variable threshold means for closing said gate means when the output of said integrator means reaches a predetermined level, and threshold control means for raising the threshold of said variable threshold means as a function of the time between said point in time and said second clock pulse.

5. A generator for producing a train of pulses comprising a source of clock pulses spaced apart by relatively short time intervals, gate means for selectively passing said pulses, means responsive to pulses passing through said gate means to close said gate means, time delay means responsive to a first clock pulse to open said gate means at a point in time during the time interval immediately preceding a second clock pulse to enable said second clock pulses to pass through said gate means, said time delay means comprising integrator means for producing an increasing output signal in response to said first clock pulse, and a variable threshold to effect opening of said gate means when the output signal from said integrator means exceeds a predetermined level, threshold control means for serially increasing the time delay of said time delay means between selected clock pulses, including storage means chargeable during the period of time between said point in time and said second clock pulse to thereby incrementally increase the threshold of said variable threshold so as to increase the time between said second clock pulse and said third clock pulse over the time between said first clock pulse and said second clock pulse.

6. A generator for producing a train of pulses comprising a source of clock pulses spaced apart by relatively short equal time intervals, gate means for selectively passing said pulses, means responsive to said pulses passing through said gate means to close said gate means, time delay means responsive to a first clock pulse to open said gate means at a point in time during the time interval occurring a plurality of time intervals after said first clock pulse and immediately preceding a second clock pulse to enable said second clock pulse to pass through said gate means, said time delay means comprising integrator means for producing linearly increasing output signal in response to said first clock pulse and a variable threshold means to effect opening of said gate means when the output of said integrator means exceeds a predetermined threshold, threshold control means for controlling the threshold of said variable threshold and including storage means for incrementally raising the threshold of said threshold means, said storage means being charged during the time between said point of time and said second clock pulse to thereby increase the time delay means of the time delay of said time delay means by at least one time interval and as a function of the time between said point of time and said second clock pulse, to thereby provide for the passage of a third clock pulse at a time distance from said second clock pulse greater than the time distance between said first clock pulse and said second clock pulse and another threshold means for resetting said storage means when the output signal of said integrator means reaches a predetermined second threshold.

7. A generator for producing a train of pulses comprising a source of clock pulses spaced apart by relatively short time intervals, gate means for selectively passing said pulses, means responsive to pulses passing through said gate means to close said gate means, time delay means responsive to a first clock pulse to open said gate means at a point in time during a time interval spaced a plurality of time intervals from said first clock pulse in immediately preceding a second clock pulse to enable said second clock pulse to pass through said gate means, said time delay means comprising integrator means for providing an output signal linearly increasing in response to said first clock pulse in variable threshold means for producing an output pulse to open said gate means and reset said integrator means to zero in response to the output signal of said integrator means reaching a predetermined level, threshold control means for increasing the time delay of said time delay means in response to pulses passing through the gate means subsequently to said first clock pulse including storage means for receiving a signal during the time period between said point of time and said second clock pulse to incrementally raise the threshold level of said variable threshold means as a function of the energy stored in said storage means, and another threshold means for blocking pulses between said source and said gate means and resetting said storage means in response to the output of said integrator means reaching a predetermined threshold.

References Cited in the file of this patent

UNITED STATES PATENTS

| | | |
|---|---|---|
| 2,830,179 | Stenning | Apr. 8, 1958 |
| 2,854,573 | Fernekees | Sept. 30, 1958 |